March 27, 1951 C. E. LOMAX 2,546,605

MEASURED SERVICE TELEPHONE SYSTEM

Filed Feb. 12, 1947

INVENTOR.
CLARENCE E. LOMAX

BY
Chas. W. Cady
ATTORNEY

Patented Mar. 27, 1951

2,546,605

UNITED STATES PATENT OFFICE 2,546,605

MEASURED SERVICE TELEPHONE SYSTEM

Clarence E. Lomax, Chicago, Ill., assignor to Automatic Electric Laboratories, Inc., Chicago, Ill., a corporation of Delaware Application February 12, 1947, Serial No. 728,185

6 Claims. (Cl. 179—7.1)

Figures 1, 2:
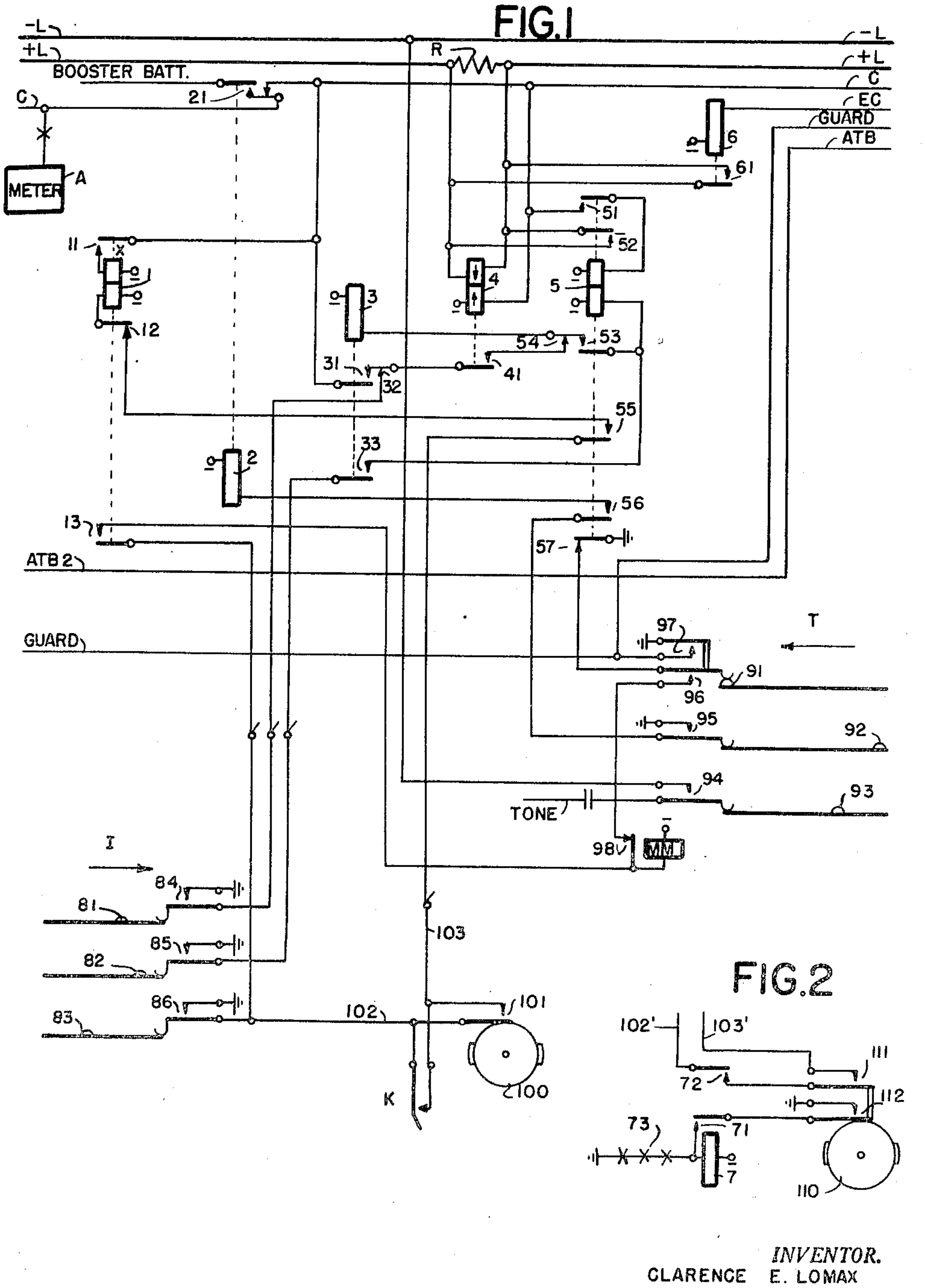

The present invention relates in general to telephone systems and in particular to measured service telephone systems.

The principal object of the invention is to provide an improved arrangement for assessing charges upon a subscriber for the completion of telephone connections.

Another object is to provide such an arrangement which will assess such charges only during specified periods of the day such as during busy hours to thereby induce subscribers to make as many of their calls as possible during non-busy hours.

A feature of the invention is that charges are assessed only for calls exceeding a certain duration.

Another feature is that charges are assessed for each period of elapsed time of a predetermined duration.

Still another feature of the invention is that a warning signal is made audible to the calling parties just prior to the time that the call is to be metered.

A further feature is that the metering circuit will not operate under the influence of certain transient conditions occurring before the called party answers.

Other objects and features of the invention will become apparent upon a further perusal of the specification taken in conjunction with the accompanying drawing in which:

Figure 1 diagrammatically illustrates the trunk circuit which controls the metering. It is adapted to be inserted between a line finder and a selector or connector in a system such as is disclosed in the copending application C. E. Lomax filed February 12, 1947 Serial Number 702,846, now Patent No. 2,513,426, granted July 4, 1950, but is not limited to such a system.

Figure 2 illustrates a method of preventing the assessing of charges under certain conditions even at specified times.

Referring now to Figure 1, a trunk circuit for controlling a subscriber's meter A is shown. It is to be understood that the meter A is associated with one particular subscriber's line, this trunk circuit being designed to control numerous meters. The trunk circuit is controlled in part by an impulse sender I consisting of cams 81, 82, and 83 all rigidly fastened to a continuously rotating shaft which is driven by any suitable means. T is a timing device consisting of cams 91, 92, and 93 all rigidly attached to a shaft which is driven by motor magnet MM. Cam 100 is a 24-hour cam driven by any suitable means. Both the impulse sender and cam 100 may be common to a group of trunks.

When the trunk is taken into use by a calling subscriber, current will flow through the speaking leads —L and +L and ground will be connected to conductor C in a well known manner.

Both windings of relay 4 will now be energized, the upper winding being connected across the series resistance R in one of the speaking leads, and the lower winding being connected between battery and grounded conductor C. Relay 4 will not operate at this time since it is a differentially wound relay. When the called party answers the call, the current through —L, +L, and the upper winding of relay 4 is reversed in a well known manner. Relay 4 now operates and prepares a circuit for relay 3 at contact 41. When cam 81 operates its spring contact 84, relay 3 operates over the following circuit; from battery through the winding of relay 3, contacts 54, 41, 32 and spring contact 84 to ground. Relay 3 thus energized closes a locking circuit for itself through contacts 54, 41, and 31 to grounded conductor C, and prepares a circuit for relay 5 at contact 33. The lower winding of relay 5 is energied over an obvious circuit when cam 82 operates its spring contact 85. Relay 5 operates and closes a locking circuit for its upper winding through contact 51 to grounded conductor C, short circuits resistance R and the upper winding of relay 4 at contact 52, prepares a circuit for relay 2 at contact 56, at contact 57 opens a point in a self-interrupted circuit to the motor magnet MM, and at contact 54 opens a point in the holding circuit of relay 3. Relay 3 is held up momentarily over the circuit from ground, contacts 85, 33 and 53, winding of relay 3 to battery but deenergizes as soon as cam 82 moves off its spring contact 85. This momentary delay in the deenergization of relay 3 is to insure that relay 5 holds over its upper winding before relay 3 breaks its starting circuit at contact 33.

The 24-hour cam 100 is so constructed as to operate its spring contact 101 during the portions of the day which are considered to be the normally busy periods. If the call is made during a non-busy period, spring contact 101 will not be closed and no further changes will take place, hence the call will not be metered. If the call occurs during what is considered to be a busy period, cam 100 will have operated its spring contact 101 thus closing a point in the starting circuit of relay 1. The lower winding of relay 1 is energized, when cam 83 operates its spring contact 86, over the following circuit; from battery, lower winding of relay 1, contacts 12, 55, 101, and spring contact 86 to ground. Relay 1 operates and at preliminary make contact 11, closes a locking circuit for its upper winding from battery to grounded conductor C, opens a point in its starting circuit at contact 12, and completes an obvious circuit to motor magnet MM at contact 13. Motor magnet MM will now operate to step the cam assembly T one step in the direction indicated and will continue to operate every time cam 83 operates its spring contact 86. Cam 91 moves off its spring contacts thereby closing a point in a self-interrupted circuit to motor magnet MM at contact 96, and connects ground to the guard conductor at contact 97. After a specified time lapse, as determined by the construction of the cam mechanism T, a warning tone is applied to the trunk by cam 93 operating its spring contact 94. This tone warns the calling parties that the call is about to be metered. A short time later cam 92 momentarily operates its spring contact 95 thus closing an obvious circuit for relay 2. Relay 2 thus energized operates meter A over an obvious circuit by connecting booster battery to the line finder portion of conductor C at contacts 21. Relay 2 deenergizes as soon as cam 92 moves off its spring contact 95 thus removing booster battery from the C conductor. Relays 1 and 5 are held up during this operation by ground returned over the right hand portion of conductor C by a subsequent selector or connector. The line finder is held against seizure at this time by the grounded guard conductor hereinbefore mentioned. This metering process will continue so long as the call is of sufficient duration to enable cam 92 to again operate its spring contact 95.

When the connection through the trunk circuit is released, ground is removed from conductor C hence relays 1 and 5 will deenergize. The deenergization of relay 5 closes a point in the self-interrupted circuit to the motor magnet MM at contact 57. If cam 91 happens to be in the position shown at the instant the trunk is released, no further changes will take place and the circuit is ready to operate should another call be made. If cam 91 is not in the position shown, motor magnet MM will be energized over a self-interrupted circuit as follows: from ground, contacts 57 and 96, interrupter contact 98, and motor magnet MM to battery. The timer T will now be stepped around until it reaches its normal position at which time cam 91 will operate its spring contacts thereby breaking the interrupter circuit at contact 96. The timer is prevented from operating meter A while restoring due to the fact that the circuit to relay 2 has been broken at contact 56 by the hereinbefore mentioned deenergization of relay 5. The grounded guard conductor holds the linefinder against seizure during the restoring interval.

If a call is made to a toll operator, the current through —L and +L will not ordinarily be reversed and relay 4 will not operate hence relay 5 cannot operate to short circuit the resistance R and the upper winding of relay 4. This function is taken care of by relay 6 which is connected to an extra control lead EC. Relay 6 will operate when conductor EC is grounded by any suitable means such as a manually operated key at the toll operator's position or automatically in the toll level of the subsequent switching equipment. Relay 6 thus energized will short circuit resistance R and the upper winding of relay 4 at contact 61. The operation of relay 4, being a differential relay, depends upon the energization of both windings in an aiding direction; thus the operation of relay 6 on a toll call, and the consequential short circuiting of the upper winding of relay 4, will insure that relay 4 will not operate to start the metering circuit should reverse battery be applied to the trunk upon the completion of the call to a distant subscriber.

The cam assembly I is constructed so that cam 82 operates its spring contact 85 just before cam 81 operates its spring contact 84. The operation of contact 85, however, is ineffective to operate relay 5 until relay 3 has been operated by the action of cam 81 and its contact 84. Thus there is a delay between the operation of relays 3 and 5 nearly equal to the time of one revolution of cam 82. The speed of rotation of the shaft which drives the cam assembly I is such that cams 81 and 82 give fairly quick operation of relays 3 and 5 so as to start the metering circuit shortly after relay 4 operates. The driving shaft, however, is not so fast as to operate both relays 3 and 5 should relay 4 be momentarily operated as the result of some transient condition. The delay between the operation of relays 3 and 5, which is controlled in combination by the construction of cams 81 and 82 and their speed of rotation, is designed to be slightly greater than such transient conditions as pulsing or ring-back on reverting calls.

If a conversation happens to be taking place at the time cam 100 moves off its spring contacts, the call will continue to be metered due to the fact that the energizing circuit for the motor magnet goes through contacts of relay 1, which is locked energized, and not through cam 100.

Referring now to Figure 2, I have shown an arrangement for preventing the 24-hour cam 110 from causing metering even during the busy hour if traffic is light during that period. This arrangement may be substituted for cam 100 of Figure 1. Relay 7 is a traffic indicating relay which will be operated, under certain predetermined traffic conditions, over conductor 73. Cam 110 is similar to cam 100 of Figure 1. When relay 7 operates it prepares a circuit for looping leads 102′ and 103′ at contact 72, and at contact 71 prepares a locking circuit for itself. If cam 110 has at this time operated its spring contacts, the locking circuit for relay 7 is completed at spring contact 112 and the looping circuit for leads 102′ and 103′ is completed at spring contact 111. Under these conditions calls will be metered, if of sufficient duration, and will continue to be metered, regardless of subsequent changes in traffic conditions, until cam 110 moves off its spring contacts. If, however, relay 7 does not operate during the time cam 110 operates its spring contacts, the circuit for looping leads 102′ and 103′ will remain open at contact 72 thus preventing metering.

It should be understood that Figure 2 is but one of several other methods which could be used to control the time of day during which metering will take place. The switch K, shown in Figure 1 connected in parallel with cam 100, can be used to manually control the metering periods. A switch, such as K, could be connected in series with a cam to manually delay the start of the metering periods.

What is claimed is:

1. In a telephone system having calling and called lines and means for establishing a connection therebetween, a meter individual to each of said calling lines, a trunk circuit included in a connection being a calling and a called line, a relay in said trunk circuit operated upon response of the called party, a pair of control relays, a third relay, a time switch closed only at predetermined periods, a control switch operating to operate said control relays in timed relation after said first relay is operated, said third relay operated after the operation of said control relays but only when said time switch is operated, a timing device operated only when said third relay is operated, for timing the connection and for operating the meter of the calling station at predetermined intervals, a self holding circuit for said third relay to maintain said relay and said timing device operated while the connection is maintained in the event that said time switch is opened during this period.

2. In a telephone system having called and calling lines, means for establishing connections therebetween, a meter individual to each calling line, a meter timing switch, a continuously operated impulse sender for transmitting impulses, a pair of control relays, an answer relay operated in response to the called party answering, a circuit completed responsive to the operation of said answer relay for connecting said impulse sender to said relays, said pair of relays operated in timed relation responsive to impulses received from said sender over said circuit, an operating circuit for transmitting impulses to said meter timing switch from said impulse sender completed responsive to the operation of said pair of relays, a second operating circuit for transmitting impulses from said timer switch to said meter, and means for operating said timing switch in response to the impulses transmitted to it over said first operating circuit from said impulse sender to thereby cause said timer to transmit impulses over said second operating circuit to said meter at predetermined intervals to thereby cause intermittent operation of said meter, the initial impulse being transmitted by said timing switch only after a definite predetermined time interval after operation of said relays has expired to thereby operate the meter associated with the calling line only in the event that the calling party maintains the connection for a definite predetermined period of time.

3. In a telephone system having called and calling lines. means for establishing connections therebetween, a meter individual to said calling line, a meter timing switch for transmitting impulses to said meter, a continuously operated impulse sender, a first relay having an operating circuit, means for preparing said operating circuit responsive to the called party answering, said first relay operated responsive to an impulse received from said impulse sender over said prepared circuit, a second relay having an operating circuit prepared responsive to operation of said first relay, said second relay operated over its operating circuit responsive to impulses received from said impulse sender, a third relay having an operating circuit prepared by said second relay, said third relay operated at times responsive to impulses received over its operating circuit from said impulse sender, holding circuits for said second and third relays to maintain same energized for the duration of said call, an operating circuit and an initial starting position for said meter timer switch, means controlled by said third relay for completing said operating circuit to said timer switch from said impulse sender, said timer switch operated from its initial starting position responsive to impulses received over its operating circuit from said sender to transmit impulses at predetermined intervals to the meter associated with the calling line, said second and third relay holding circuits opened on release of the call to release said second and third relays, and circuit means operated responsive to the release of said third relay to restore the timer switch to its initial starting position.

4. In a telephone circuit in which connections are established between calling and called lines, a meter associated with each calling line, meter control equipment included in a connection established between a calling and a called line, a circuit for rendering said equipment operative, means controlled by the response of the called subscriber for initiating the operation of said equipment, a timer switch for closing a part of said circuit for rendering said equipment operative, said timer switch closing said part only at certain pre-determined times of the day, and a traffic responsive means for closing another part of said circuit for rendering said equipment operative, said traffic responsive means closing said other part only during periods of predetermined traffic load to thus render said equipment operative only during said pre-determined times of the day and then only during periods of pre-determined traffic load.

5. In a telephone system in which connections are established between calling and called lines, a meter associated with each calling line, and meter control equipment included in a connection established between a calling and a called line comprising an impulse sender for transmitting impulses, a timer device, a pair of cam springs operated by said timer device at pre-determined times of the day, a traffic relay controlled by the traffic conditions of the system, a pair of relay springs operated by said traffic relay, and a circuit means including said operated cam springs and said operated relay springs connected in series for transmitting said impulses to the said meter of said calling line to cause intermittent operation of said meter.

6. In a telephone system in which connections are established between calling and called lines, a meter associated with said calling line, an impulse sender for transmitting impulses, a timer device, a pair of cam springs associated with said timer device, said timer device operative to close said cam springs at pre-determined times of the day, a second timer device intermittently operative for controlling the intermittent operation of said meter, a circuit means including said closed cam springs for connecting said impulse sender to said second timer device to cause intermittent operation thereof, a second circuit means controlled by the intermittent operation of said second timer to thereby cause intermittently operation of said meter, and a key circuit in parallel with said cam springs for causing operation of said second timer device independent of said first timer device.

CLARENCE E. LOMAX.

REFERENCES CITED

The following references are of record in the file of this patent:

UNITED STATES PATENTS

| Number | Name | Date |
|---|---|---|
| 1,480,403 | Lattig et al. | Jan. 8, 1924 |
| 1,799,679 | Dunham et al. | Apr. 7, 1931 |
| 1,862,537 | Hatton et al. | June 14, 1932 |
| 1,917,884 | Hague | July 11, 1933 |
| 2,225,386 | Hebel | Dec. 17, 1940 |
| 2,232,181 | McClew et al. | Feb. 18, 1941 |
| 2,350,177 | MacKen | May 30, 1944 |
| 2,385,061 | Clark | Sept. 18, 1945 |
| 2,428,376 | Matthies | Oct. 7, 1947 |